United States Patent [19]

Balzer

[11] 4,134,478

[45] Jan. 16, 1979

[54] BRAKE APPARATUS INCLUDING PLURAL ACTUATING ASSEMBLIES

[75] Inventor: David J. Balzer, East Peoria, Ill.

[73] Assignee: Caterpillar Tractor Co., Peoria, Ill.

[21] Appl. No.: 816,789

[22] Filed: Jul. 18, 1977

[51] Int. Cl.² .......................................... F16D 65/16
[52] U.S. Cl. .............................. 188/106 P; 188/71.6;
188/72.5; 188/170; 192/70.12; 192/70.27;
192/83; 192/91 R
[58] Field of Search ................... 188/71.6, 72.5, 72.6,
188/106 F, 106 P, 246 E, 170; 192/70.12, 70.27,
91 R, 83, 113 B

[56] References Cited

U.S. PATENT DOCUMENTS

| 2,951,561 | 9/1960 | Davis | 188/72.5 |
|---|---|---|---|
| 3,337,009 | 8/1967 | Meier | 188/72.5 X |
| 3,456,767 | 7/1969 | Hollnagel et al. | 188/170 |
| 3,770,085 | 11/1973 | Cottingham | 188/170 X |
| 3,791,492 | 2/1974 | Neilsen | 188/72.5 X |
| 3,847,254 | 11/1974 | Gardner | 188/170 X |
| 3,946,840 | 3/1976 | Sommer | 192/113 B X |
| 3,999,634 | 12/1976 | Howell | 188/264 E X |

*Primary Examiner*—George E. A. Halvosa
*Attorney, Agent, or Firm*—Charles E. Lanchantin, Jr.

[57] ABSTRACT

A service brake actuating assembly is effective to bring friction material into contact with the opposite sides of a rotating disc by urging such elements in an axial direction toward a reaction wall. A compact parking and emergency brake actuating assembly extends through the wall and is alternately effective to also clampingly engage the disc by urging such elements in the opposite axial direction.

9 Claims, 3 Drawing Figures

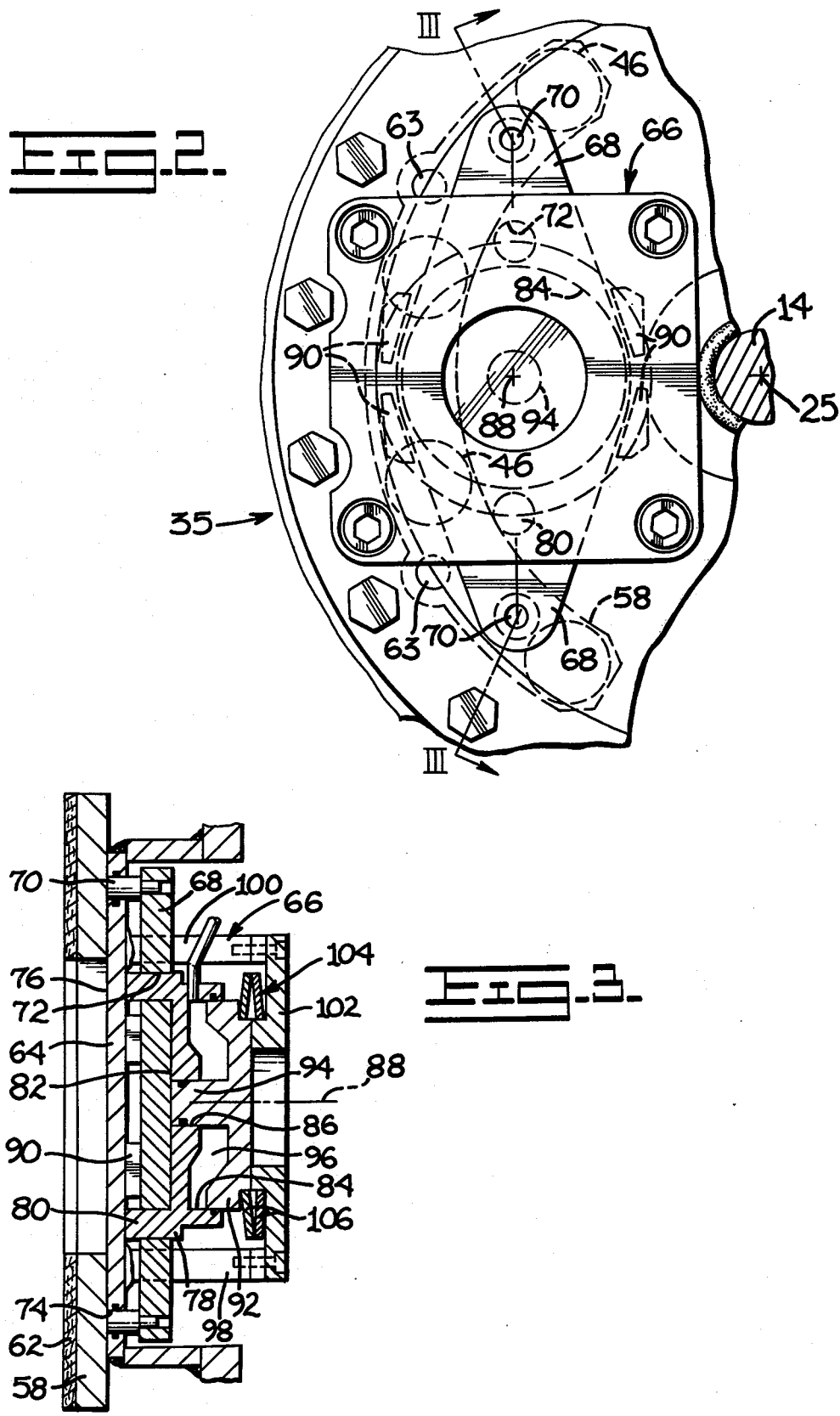

BRAKE APPARATUS INCLUDING PLURAL ACTUATING ASSEMBLIES

BACKGROUND OF THE INVENTION

This invention relates to a brake apparatus, and more particularly to a combination service brake and parking and emergency brake.

In a vehicle including a service brake, wherein a rotating disc is operatively associated with the vehicle drive system, friction material is brought into engagement with the disc to retard rotational movement of the disc and to brake the vehicle. Such known arrangements become more complicated when, for reasons of economy, attempts are made to integrate a combination parking and emergency brake into the service brake. For example, one integrated arrangement of such different brakes is shown in U.S. Pat. No. 3,770,085 issued Nov. 6, 1973 to E. R. Cottingham.

Unfortunately, there is not always sufficient room for a completely encircling service brake and parking and emergency brake so that another problem resides in generally axially aligning these two brakes somewhere about the periphery of the disc. Along with this, is the recognized need to apply substantially only axial forces to the various elements so that any tendency to cock them during application of either brake is minimized.

In addition to the aforementioned problems of cost, compactness and alignment of the two forms of brakes, there is a continual need to extend the service life of, and to extend service access to, the braking members. Particularly, it is desirable to provide convenient and effective access for replacement of the friction material which is preferably common to both brakes.

SUMMARY OF THE INVENTION

The present invention is directed to overcoming one or more of the problems as set forth above.

According to the present invention this is accomplished by providing a brake apparatus including a case having a reaction wall, a disc rotatably mounted in the case, a first brake actuating assembly including first and second members disposed on either side of the disc and first means for biasing various elements thereof in an axial direction toward the reaction wall for clamping the disc, and a second brake actuating assembly including projection means extending through the wall and second means for biasing the projection means and such elements in an axial direction away from the wall for alternately clamping the disc.

Advantageously, the brake apparatus of the present invention provides a compact parking and emergency brake that cooperates with an axially aligned service brake in a compact and effective manner. Moreover, the various elements thereof are easily accessible for servicing.

BRIEF DESCRIPTION OF THE DRAWINGS

Other objects of the invention will become apparent from a study of the following specification and drawings, in which:

FIG. 2 is a diagrammatic and fragmentary side elevational view at a reduced scale taken along the line II—II of FIG. 1; and FIG. 3 is a diagrammatic and developed sectional view taken along the line III—III of FIG. 2.

DESCRIPTION OF THE PREFERRED EMBODIMENT

Figure 1:
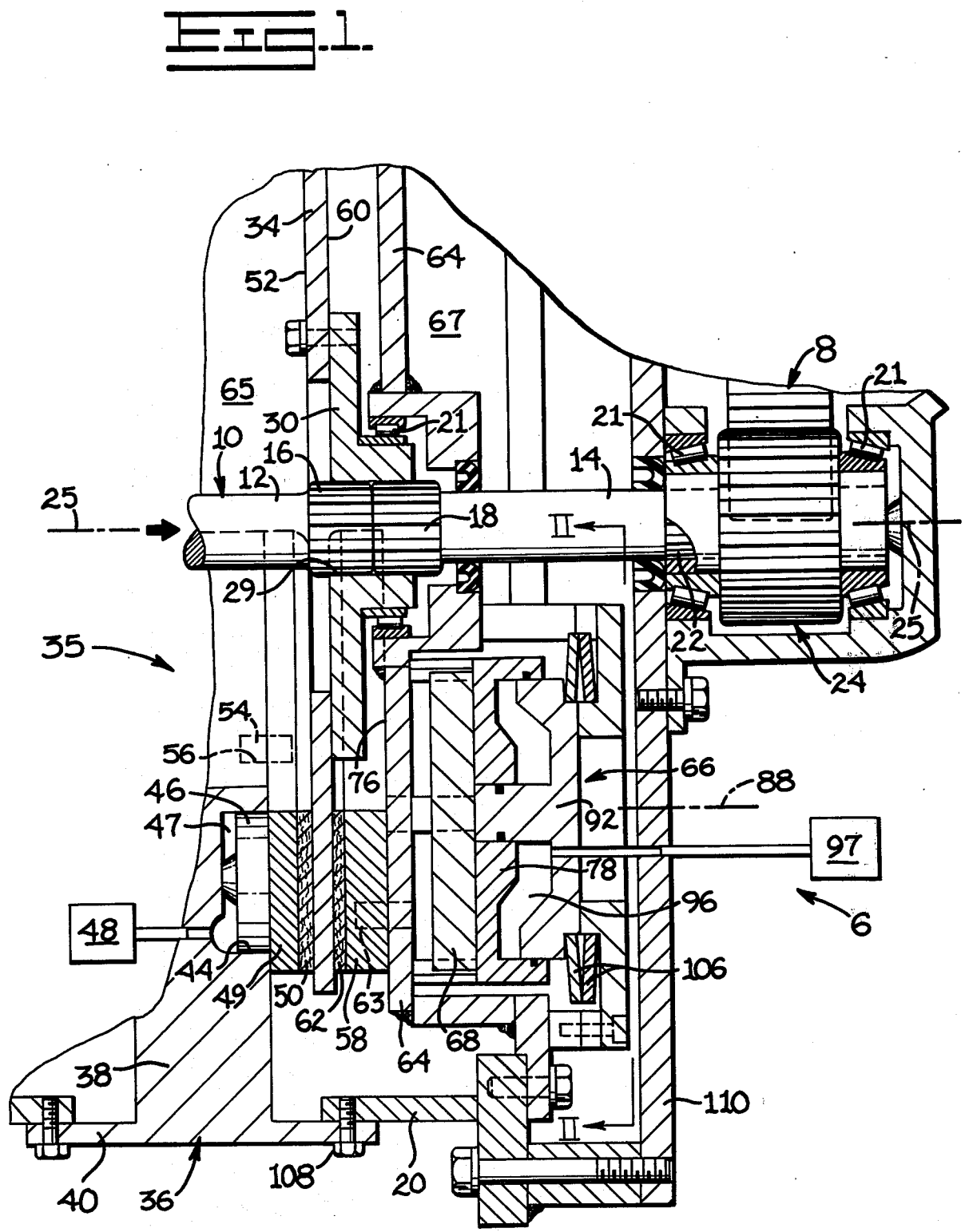
FIG. 1 is a diagrammatic sectional plan view of a portion of a vehicle including the brake apparatus of the present invention.

Shown in FIG. 1 is a portion of a vehicle 6 such as a track-type tractor including a vehicle drive system 8 having a drive shaft 10 made up of a pair of drive shaft parts 12, 14 having splines or splined ends 16, 18 in adjacent and abutting relation. The drive shaft 10 is rotatably mounted within a casing 20 on a plurality of antifriction rolling bearings 21, and the extended end 22 of the drive shaft 10 is operatively connected with vehicle output drive means 24, such that rotation of the drive shaft 10 about an axis 25 drives the vehicle. The external splined ends 16 and 18 of the drive shaft parts are intermeshingly coupled to an internal spline 29 of a hub 30 and the hub has fixed thereto an annular plate or disc 34. Thus, it will be seen that the disc 34 rotates upon rotation of the shaft 10 about its longitudinal axis, and any retardation of the disc acts to brake the shaft and in turn to brake the drive system of the vehicle.

A brake apparatus 35 constructed in accordance with the present invention includes a service brake actuating assembly 36 which is operatively associated with the disc 34 and includes a main body 38 having a generally arcuate or curved configuration and an integral mounting plate 40 for releasably securing the body to the casing 20. A plurality of bores 44 are defined in the body for receiving a corresponding number of axially movable cylindrical pistons 46, only one of each of which is shown in FIG. 1 for illustrative convenience. Together, the pistons and main body define a plurality of internal chambers 47 which may be selectively pressurized by fluid directed simultaneously thereto from a conventional service brake fluid control system 48. An elongated, curved, and axially movable braking member or shoe 49 is positioned along one side of the main body, and preferably a lining of friction material 50 is mounted thereon immediately adjacent one side 52 of the disc 34. The braking member 49 is movable along the axis 25 and toward or away from the main body, such movement being guided by a plurality of axially oriented pins 54 fixed to the body and extending through respective bores 56 within the braking member.

Another elongated, curved or arcuate braking member or shoe 58, similar in configuration to the braking member 49, is disposed on the other side 60 of the disc 34. Preferably, a lining of friction material 62 is secured thereto in immediately adjacent relation with such other side of the disc. The second braking member 58 is also axially movable on a plurality of guide pins 63 secured to an upright compartment separating wall and reaction member 64 which is in turn releasably connected to the casing 20. This separating wall advantageously divides the casing into an inner wet compartment 65 and an outer dry compartment 67.

As best shown in FIGS. 2 and 3, the brake apparatus 35 includes a parking and emergency brake actuating assembly 66 releasably connected to the casing 20 axially outwardly, or to the right when viewing FIGS. 1 and 3, of the separating wall 64. Such assembly operatively extends axially through and beyond the separating wall when in the active or disc engaging mode of operation.

More particularly, the brake actuating assemby 66 includes a generally diamond-shaped brake engaging plate 68 having a pair of axially inwardly extending engagement projections or end fixtures 70 at the opposite ends thereof, and a plurality of axially extending cylindrical bores 72 therethrough. Advantageously, the end fixtures 70 extend in sealed relation through a pair of openings 74 in the separating wall to abut and bias the second braking member 58 away from a reaction surface 76 formed on the inside of the separating wall.

Secondly, the brake actuating assembly 66 includes a cylindrical housing member 78 having a plurality of cylindrical posts 80 which extend through the bores 72 in the brake engaging plate 68 to make contact with the separating wall 64. Thus, the housing member is nonrotatably coupled to the engaging plate and the engaging plate is non-rotatably coupled to the separating wall, but both the housing member and engaging plate are axially movable with respect thereto. The housing member also has an inwardly facing seat 82, and an outwardly facing cylindrical recess 84 and a cylindrical passage 86 arranged symmetricaly along an axis 88 parallel to the axis 25 of the shaft 10. Moreover, a plurality of axially inwardly extending support legs 90 are found on the housing member which closely straddle the engaging plate.

Thirdly, the brake actuating assembly 66 preferably includes a single axially movable cylindrical piston 92 for compactness which is reciprocally disposed within the recess 84 of the housing member 78. The piston has a cylindrical extension 94 which extends through the passage 86 to contact the brake engaging plate 68. Together, the piston and housing member define an internal chamber 96 which is normally pressurized by fluid directed thereto from a conventional fluid control system 97 to place the parking and emergency brake actuating assembly in an inactive or disengaged mode of operation.

Lastly, the brake actuating assembly 66 includes a supporting frame 98 preferably having a plurality of legs 100 integrally secured to the compartment separating wall 64 and an end wall 102 releasably coupled thereto. Furthermore, resilient spring means 104, such as preferably a plurality of frustoconical compression spring washers 106 arranged in series in a stack, are mounted between the end wall and the piston 92 for biasing the piston axially inwardly.

For normal operation of the vehicle 6, fluid at a preselected pressure is introduced from the control system 97 into the chamber 96 of the parking and emergency brake actuating assembly 66 so that the parts take the positions shown in the drawings. Thus, the piston 92 is moved axially outwardly or to the right when viewing FIG. 1 against the resilience of the spring washers 106 so that it no longer urges the brake engaging plate 68 axially inwardly. Under these conditions the brake engaging plate is free to axially move against the seat 82 of the housing member 78 so that the end fixtures 70 do not bear against the braking member 58 and the parking and emergency brake actuating assembly is disengaged.

Simultaneously, pressurized fluid may be selectively supplied when desired from the control system 48 to the other chambers 47 for activating the service brake actuating assembly 36. Specifically, pressurizing the chambers 47 extends the pistons 46 axially outwardly or to the right when viewing FIG. 1 to urge the braking member 49 and friction material 50 into contact with the one side 52 of the disc 34. In the instant embodiment four pistons 46 contact the braking member at relatively uniformly spaced apart locations as is indicated in FIG. 2 to better balance the axial loading thereof. The disc is subsequently moved axially outwardly to a relatively limited degree along the axis 25 on the splines 16 and 18 by such contact so that the other side 60 bears against the friction material 62. This urges the other braking member 58 against the reaction surface 76 of the separating wall 64 so that the rotation of the disc 34 and thereby the vehicle drive system 8 is retarded. Of course it should be understood that the pressure in the chambers 47 can be controllably modulated directly by the vehicle operator to almost any effective level so that a wide range of braking capability or energy absorption can be effected.

With the service brake actuation chambers 47 being unpressurized and the service brake actuating assembly 36 being thus disengaged, the vehicle may be placed into a parking or emergency braking mode. All that is needed is to release fluid pressure from the chamber 96 of the parking and emergency brake actuating assembly 66. This may be purposefully accomplished under the control of the operator, or may be automatic in the event of any failure or shut down of the control system 97 or of the conduits communicating pressurized fluid to the chamber 96. Without counterbalancing pressure the spring washers 106 urge the piston 92 axially inwardly so that it abuts against the brake engaging plate 68 and displaces it from its retracted or seated position. Subsequently the end fixtures 70 are extended axially inwardly beyond the reaction surface 76 to directly bear against the curved braking member 58. Advantageously, as best shown in FIG. 2, the end fixtures make contact with the braking member 58 approximately midway between the inner and outer radius thereof at two locations peripherally spaced along its length and located about centrally of each half of the curved braking member. This symmetrical loading serves to better balance forces axially into the braking member, and it will be noted that the axis 88 of the cooperating piston 92, housing member 78 and brake engaging plate is substantially centrally located between the end fixtures for improved axial force transmitting action into the friction material with minimal cocking of the parts.

During the aforementioned emergency or parking brake action, axial inward extension of the end fixtures 70 and the braking member 58 causes the friction material 62 to engage against the other side 60 of the disc 34. The disc is thereby urged axially to the left when viewing FIGS. 1 and 3, whereupon the friction material 50 contacts the inner side 52 of the disc and the other braking member 49 is forced against the main body 38. The disc is thereby gripped between the friction material of the braking members or shoes at a substantial and preselected level of force as determined by the capacity of the resilient spring means 104.

Attention is drawn to the fact that the same friction material 50 and 62 is utilized for both service braking and emergency and parking braking. To better dissipate heat and to lubricate the drive system in the region of the friction material lubricating fluid is supplied to the components in the axially inward wet compartment 65. While this extends the service life thereof, it should be recognized that the preferred construction of the service brake actuating assembly 36 allows the brake members 49 and 58 and associated friction materials to be conveniently serviced. Particularly, as shown in FIG. 1, radially outward removal of the main body 38 by screw threaded release of a plurality of bolts 108, permits the brake members and friction material to be removed for servicing or replacement independent of the disc 34.

This is possible since the curved brake members or shoes do not fully encircle the drive shaft 10 but are, in effect, only segments of an annular ring. On the other hand, the components of the parking and emergency brake actuating assembly 66 are also independently servicable upon removal of an end cover 110 from the casing 20. This opens up the dry compartment 67 and allows the parts of the parking and emergency brake actuating assembly to be axially separated as needed for service or repair.

Other aspects, objects and advantages of this invention can be obtained from a study of the drawings, the disclosure and the appended claims.

The embodiments of the invention in which an exclusive property or privilege is claimed are defined as follows:

1. In a brake apparatus of the type including and generally contained within a case having a separating wall, a disc rotatably mounted in the case on an axis, a first brake actuating assembly having a body connected to the case, and first and second braking members located on either side of the disc, first means operative at one side of the wall for biasing the first braking member against the disc, and the disc against the second braking member and toward the separating wall in a first direction braking rotation of the disc, a second brake actuating assembly connected to the case and having a projection extendable through the separating wall, and second means operative at the other side of the wall for axially biasing the projection against the second braking member, the second braking member against the disc and the disc against the first braking member and toward the body in a second direction opposite the first direction braking rotation of the disc, the improvement comprising:

said second brake actuating assembly having a housing, a piston reciprocally mounted in said housing and defining a chamber therebetween;

said second means including resilient compression spring means for biasing said piston and said projection toward said second braking member in the absence of a preselected fluid pressure in said chamber; and said housing being free to move axially with respect to said wall in the absence of fluid pressure in said chamber.

2. The brake apparatus of claim 1 wherein said second brake actuating assembly includes a brake engaging member having said projection thereon and means for non-rotatably coupling said brake engaging member and said housing to each other and to said wall while leaving said brake engaging member and said housing free to move axially with respect to said wall.

3. The brake apparatus of claim 2 wherein said brake engaging member is an elongated plate having said projection thereon and another one of said projections thereon, said projections extending in sealed relation through said wall.

4. The brake apparatus of claim 2 wherein said piston has a cylindrical extension thereon, said housing has a cylindrical passage therethrough, and said extension of said piston extends through said passage and contacts said brake engaging member.

5. The brake apparatus of claim 1 wherein said second brake actuating assembly includes a brake engaging member and a support member, said support member being releasably secured to said wall, and said brake engaging member having said projection thereon.

6. The brake apparatus of claim 5 wherein said brake engaging member and said housing are non-rotatably coupled to each other and are movable with respect to said wall.

7. The brake apparatus of claim 5 wherein said resilient means continually biases said piston away from said support member and towards said wall.

8. The brake apparatus of claim 5 wherein said housing has a recess and a passage therethrough, said piston has an extension, and said piston is received in said recess with said extension passing through said passage and contacting said second brake engaging member.

9. The brake apparatus of claim 1 wherein said second braking member is an arcuate segment of an annular ring having inner and outer radii, and said second brake actuating assembly includes a brake engaging member having said projection thereon and another similar projection thereon, said projections being located to contact said second braking member approximately midway between said radii and about centrally of each half of said second braking member.

* * * * *